(12) United States Patent
Schoner

(10) Patent No.: US 7,130,953 B2
(45) Date of Patent: Oct. 31, 2006

(54) BUS ARCHITECTURE TECHNIQUES EMPLOYING BUSSES WITH DIFFERENT COMPLEXITIES

(75) Inventor: Brian Schoner, Fremont, CA (US)

(73) Assignee: Broadcom Corporation, Irvine, CA (US)

(*) Notice: Subject to any disclaimer, the term of this patent is extended or adjusted under 35 U.S.C. 154(b) by 0 days.

(21) Appl. No.: 10/437,497

(22) Filed: May 13, 2003

(65) Prior Publication Data

US 2004/0177205 A1 Sep. 9, 2004

Related U.S. Application Data

(60) Provisional application No. 60/452,366, filed on Mar. 5, 2003.

(51) Int. Cl.
*G06F 13/36* (2006.01)
(52) U.S. Cl. .................. 710/312; 711/141; 710/311
(58) Field of Classification Search ............ 710/312, 710/306, 307, 309–311, 313–315; 711/141
See application file for complete search history.

(56) References Cited

U.S. PATENT DOCUMENTS

| | | | | |
|---|---|---|---|---|
| 5,727,172 A | * | 3/1998 | Eifert et al. ............... | 710/110 |
| 5,812,800 A | * | 9/1998 | Gulick et al. .............. | 710/306 |
| 5,828,852 A | * | 10/1998 | Niedermeier et al. ....... | 710/110 |
| 6,112,311 A | * | 8/2000 | Beardsley et al. .......... | 714/3 |
| 6,298,420 B1 | * | 10/2001 | Chittor et al. ............. | 711/147 |
| 6,363,448 B1 | * | 3/2002 | Waller et al. .............. | 710/312 |
| 6,532,511 B1 | * | 3/2003 | Brooks ...................... | 710/305 |
| 6,598,110 B1 | * | 7/2003 | Nally et al. ................ | 710/312 |
| 6,636,947 B1 | * | 10/2003 | Neal et al. ................. | 711/141 |
| 2003/0212823 A1 | * | 11/2003 | Anderson et al. .......... | 709/245 |

OTHER PUBLICATIONS

MIPS, "MIPS SOC-it™ 101 System Controller Family Datasheet" Online! Nov. 30, 2002, MIPS Technologies Inc., Internet, XP002288979 Retrieved from the Internet: URL:http://www.mips.com/content/Documentation/MIPSDocumentation/SystemControllerIP/MD00164-2B-SOCIT101-DTS-01.01.pdf> 'retrieved on Jul. 19, 2004!.

MIPS: "SOC-it Press Presentation" 'Online! Jul. 29, 2002, MIPS Technologies Inc., Internet, XP002288980 Retrieved from the Internet URL:http//www.mips.com/content/PressRoom/PressKits/files/SOC-it_Press_Presentation.pdf> 'retrieved on Jul. 19, 2004!.

Aldworth P J: "System-on-a-chip bus architecture for embedded applications" Computer Design, 1999. (ICCD '99). International Conference on Austin, TX, USA Oct. 10-13, 1999, Los Alamitos, CA, USA, IEEE Comput. SOC, US, Oct. 10, 1999, pp. 297-298, XP010360495 ISBN: 0-76950-0406-X.

IBM: "The CoreConnect Bus Architecture" IBM, 1999, XP002204519.

Arm: "AMBA Specification (Rev. 2.0)" May 13, 1999, Arm XP002288981.

Flynn D: "AMBA: Enabling Reusable On-Chip Designs" IEEE Micro, IEEE Inc. New York, US, vol. 17, No. 4, Jul. 1, 1997, pp. 20-27, XP000658531.

* cited by examiner

*Primary Examiner*—Rehana Perveen
*Assistant Examiner*—Clifford Knoll
(74) *Attorney, Agent, or Firm*—McAndrews, Held & Malloy, Ltd.

(57) ABSTRACT

An integrated circuit system (70) includes a processor (130) and a system bus (12) with a first complexity coupled to the processor. Apparatus for enabling communication between the processor and one or more devices through the system bus include a first device (90), a second device (80), and a first bus interface (72) coupled to the system bus (12), coupled to the first device (90) through a first bus (92) with a second complexity less than the first complexity and coupled to the second device (80) through a second bus (82) with a third complexity less than the first complexity.

51 Claims, 4 Drawing Sheets

BUS ARCHITECTURE TECHNIQUES EMPLOYING BUSSES WITH DIFFERENT COMPLEXITIES

CROSS REFERENCE TO RELATED APPLICATIONS

The applicant claims the benefit of provisional application 60/452,366, entitled "SYSTEM-ON-CHIP (SOC) BUS ARCHITECTURE WITH FAST LOCAL ACCESS," filed Mar. 5, 2003.

BACKGROUND OF THE INVENTION

This invention relates to control of busses and more particularly relates to such control employing busses of different complexities.

A modern integrated circuit may embody a system on a chip (SoC) that includes bus architectures composed of a few key components:

A complex system bus (or "backbone") that connects all modules;

A standard interface bridge which bridges the system bus to one or more relatively simple busses; and Bridges/switches that may segment the system bus.

Busses in a typical SoC use many bus protocols of differing levels of complexity. A bus typically employs an address, data, and control.

Since all busses must have address and data, the difference between a low-complexity (or "simple") bus, and a high-complexity (or "complex") bus is the control. A reasonable measure of control complexity is state-space, or the number of states the bus may be in.

A typical SoC includes a multiple-master bus that supports multiple bus masters, also called "initiators" and "requesters," and one or more single-master busses that support only one bus master.

A bus bridge is used to connect two (or more) separate busses. Bridges may connect two busses with the same protocol (for example, a PCI-to-PCI bridge,) or busses with different protocols (for example, a PCI-to-USB bridge or a bridge that translates between a first bus that operates in a first plurality of states and a second bus that operates in a second plurality of states that may form a subset of the first plurality of states.)

It is difficult to design devices for a complex bus, like PCI. For this reason, bus interfaces employing bus bridges are commonly available to simplify the task. A bus interface can be used as a bridge between a relatively simple bus and a relatively complex bus. A bus interface allows a designer to access a complex bus from a simple, single-master bus. This simplifies the designer's task.

A multiple-master or complex bus is usually significantly more complex than a single-master or simple bus. A multiple-master bus may include facilities for:

Arbitration of the multiple masters;

Resource conflicts, such as, for a segmented bus, arbitration leading to an impasse in which the transaction on segment one cannot proceed until segment two is available, but the transaction on segment two cannot complete until segment one is available;

A BACKOFF/RETRY mechanism to resolve such conflicts;

Bus sharing to prevent one master from monopolizing the bus by using strict timing rules;

TIMEOUT/ABORT mechanisms to enforce the timing rules;

Bus locking for masters requiring a set of transactions to proceed without interruption from other masters; and A bus LOCK mechanism to support the locking functionality.

A single-master bus or simple bus does not usually require most of the functions described in the preceding paragraph.

A simple bus may have a few states for "read," "write," or "idle." A complex bus may have a very large state-space with controls and states for arbitration, errors, configuration, timing, bursts, termination, and interrupts.

It is important to understand the range of bus complexities, and how significantly bus complexity affects chip design. A simple read/write/address/data bus can be defined with a few states, and a few sheets of paper. A complex bus, like PCI, has hundreds of states and requires many hundreds of pages to describe. This difference in complexity translates directly into hardware costs in terms of gates, development time and verification time.

FIG. 1 shows one form of an existing SoC bus architecture. An integrated circuit 10 employing an SoC includes a complex system bus 12 comprising an address bus 14 and a data bus 16. Circuit 10 also includes master devices 31–32 and slave devices 35–37. Simple single-master busses 41–42 comprise address busses 44–45 and data busses 47–48. Simple slave busses 51–53 include address busses 54–56 and data busses 57–59. Busses 51–53 also comprise single-master busses.

The system bus 12 may have a very complex multiple-master protocol. Most SoC architectures define modules with a simple single-master local bus, and use bus interfaces, such as interfaces 21–25, to translate the local bus transactions to the complex system bus protocol.

FIG. 2 illustrates another form of an existing SoC bus architecture in which a bus bridge 50 divides system bus 12 into segment 1 and segment 2. For complex SoCs with many bus masters, the system bus quickly becomes overloaded, and performance suffers. Bus bridge 50 can be used to segment the system bus.

Segmenting the system bus has several effects:

Each bus segment is shorter, and has fewer clients, which may allow the bus to run at a faster clock rate;

Some transactions may occur in parallel (e.g., Master 31 may access Slave 32, while Master 35 accesses Slave 36 simultaneously;

If Master 31 accesses Slave 36, the communication must go through the bus bridge, which will add some delay to the transaction, and will require arbitrating for both bus segments 1 and 2;

If Master 31 tries to access Slave 36, and Master 35 tries to access Slave 32, there is a potential for a resource conflict, and one master will need to backoff, and allow the other master to proceed;

The bus bridge may be used to restrict access to some devices (e.g., the bridge may prohibit Master 35 from accessing Slave 31) due to security reasons.

As systems become more complex, more levels of bus segmentation may be used. Bus topologies may grow very complex, and be very difficult to analyze.

Complex bus topologies, are a problem because:

System bus bridges, crossbars, and switches add cost to the system;

Resource conflicts can be difficult to manage;

Bus performance can be difficult to analyze; and

Changes to the bus topology can have large effects on the system performance.

The present invention addresses the foregoing problems and provides a solution.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

An apparatus embodiment of the present invention is useful in an integrated circuit system comprising a system bus with a first complexity. In such an environment, communication among a plurality of devices in part through the system bus is enabled by providing apparatus comprising:

at least a first device;
at least a second device; and
a first interface coupled to the system bus, coupled to the first device through a first bus with a second complexity less than the first complexity and coupled to the second device through a second bus with a third complexity less than the first complexity.

A method embodiment of the present invention is useful in an integrated circuit system comprising plurality of devices interconnected by a first bus and one or more second busses. In such an environment, data is transmitted among the plurality of devices with reference to an address associated with the data by a method comprising operating the first bus at the first complexity, and operating the one or more second busses at a second complexity less than the first complexity. The method translates between the first complexity and the second complexity so that the data is routed on the first bus and on the one or more second busses in response to the address or is routed only on the one or more second busses in response to the address.

By using the foregoing techniques, bus architecture is simplified and the design of circuits for communication between devices coupled through busses is simplified to a degree previously unattainable. The time required for such design and the cost of such design is reduced accordingly.

These and other advantages and novel features of the present invention, as well as details of an illustrated embodiment thereof, will be more fully understood from the following description and drawings.

DETAILED DESCRIPTION OF THE INVENTION

Figure 3:
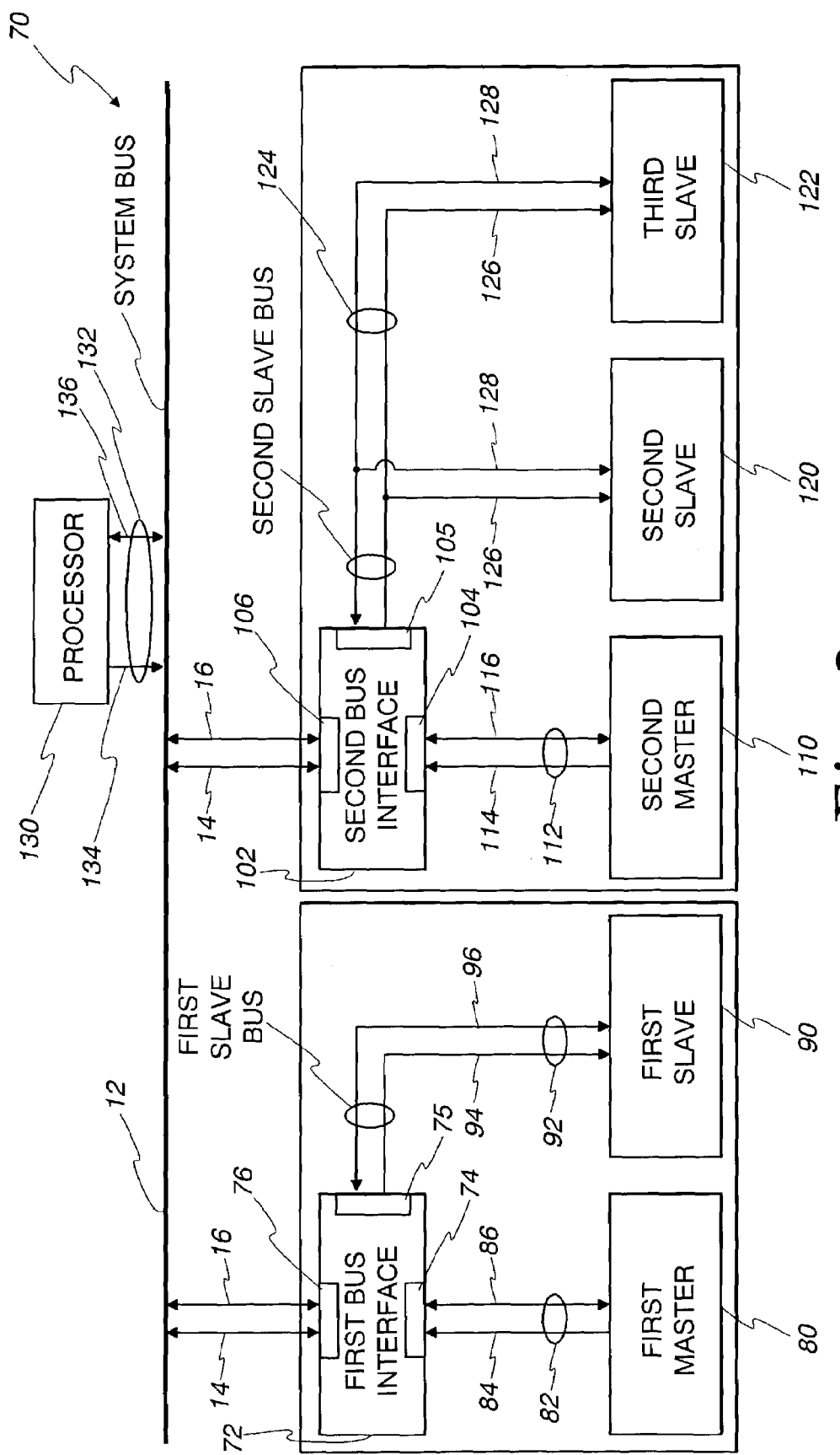
FIG. 3 is a schematic block diagram of one form of integrated circuit made in accordance with the invention and employing 3-way bus interfaces.

Referring to FIG. 3, an integrated circuit system 70 employing an SoC according to one embodiment of the invention includes a first bus interface 72, which may include a bridge. The word "interface" is used in the sense described in *The Authoritative Dictionary Of IEEE Standards Terms* (IEEE Press 2000), p. 574 "(4) A shared boundary." The word "bridge" is used in the sense described in *The Authoritative Dictionary Of IEEE Standards Terms* (IEEE Press 2000), p. 119 "(4) A hardware adapter that forwards transactions between buses." A bus interface can be used as a bridge between a relatively simple bus and a relatively complex bus. Interface 72 also includes a master port 74, a slave port 75 and a bus port 76, and handles communication with a first master device 80. Master device 80 may be implemented, for example, by a processor (such as processor 130), or an MPEG decoder, and may be coupled to the other end of a bridge. Interface 72 is coupled to system bus 12 through port 76 and is coupled to device 80 through a first master bus 82, which includes an address bus 84 and a data bus 86.

A first slave device 90 is coupled to port 75 of interface 72 by a first slave bus 92, which includes an address bus 94 and a data bus 96. Slave 90 may be an end user, a generator of data, or a bridge to another bus that is coupled to an end user.

The term "coupled" includes coupling between devices that can communicate through intermediate devices. For example, master 80 is coupled to slave 90 through bus 82, interface 72 and bus 92.

A second bus interface 102, which may include a bridge, includes a master port 104, a slave port 105 and a bus port 106. Interface 102 is coupled to system bus 12 through port 106 and is coupled to a second master device 110 through a second master bus 112 that includes an address bus 114 and a data bus 116.

Interface 102 communicates with a second slave device 120 and a third slave device 122 through a second slave bus 124, which includes an address bus 126 and a data bus 128.

A processor device 130, such as a digital signal processor, is coupled to system bus 12 through a bus 132 comprising an address bus 134 and a data bus 136. Processor 130 may operate as a master with respect to slaves 90, 120 and 122.

Figure 4:
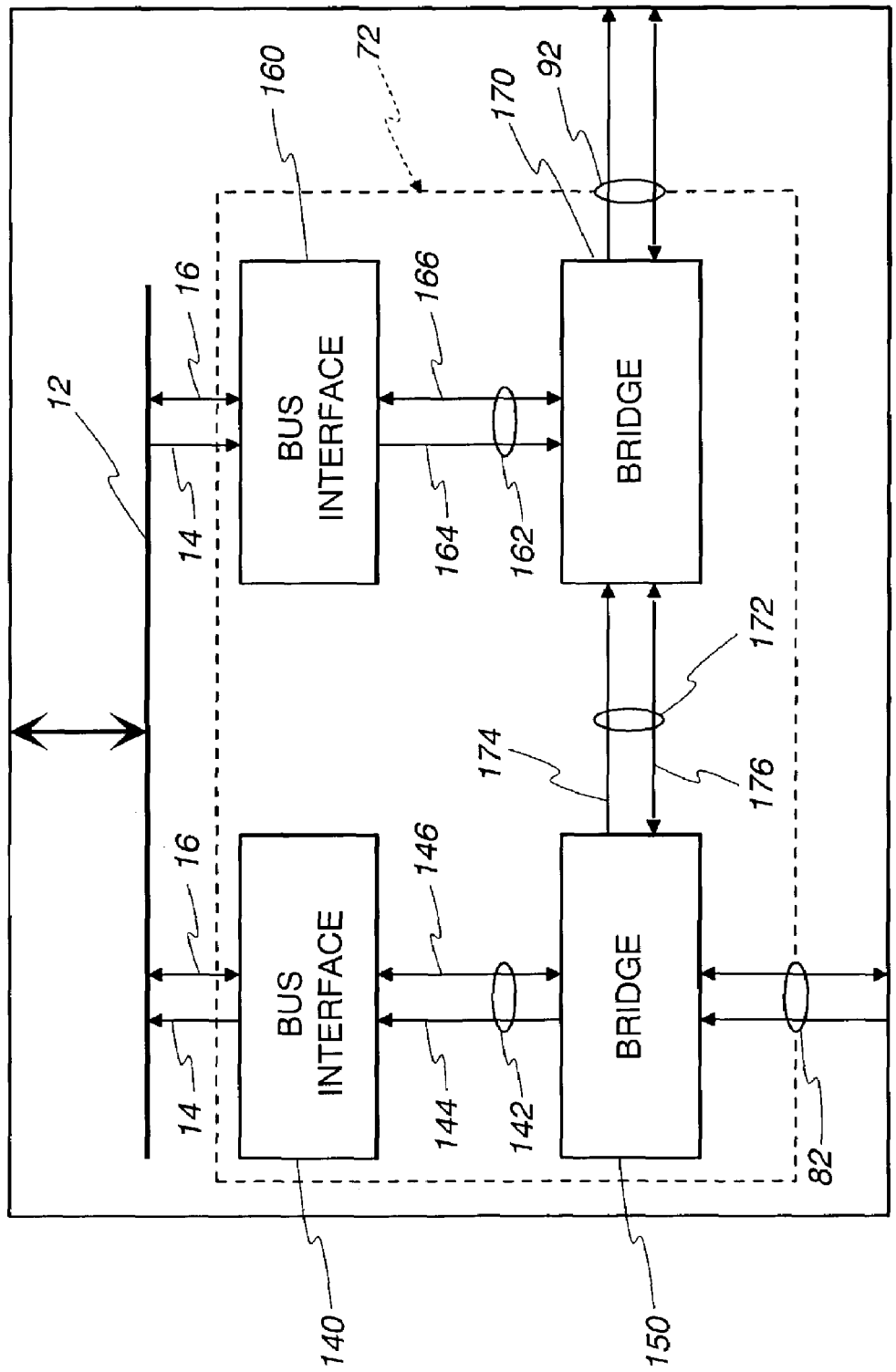
FIG. 4 is a schematic block diagram of one of the 3-way bus interfaces shown in FIG. 3.

FIG. 4 illustrates 3-way interface 72 in more detail. Interface 72 could be built in a number of ways. FIG. 4 shows one possible implementation of interface 72, but other implementations are possible. An exemplary functionality of interface 72 includes:

Connecting a simple bus, such as bus 82, with one or more masters, such as master 80;
Connecting a simple bus, such as bus 124, with one or more slaves, such as slaves 120 and 122;
Connecting a simple bus, such as bus 142, with system bus 12;
Allowing a local master, such as master 80, to access system bus 12 and anything connected to the system bus;
Allowing the system bus 12 to access local slaves, such as slaves 90, 120 and 122; and
Allowing a local master, such as master 110, to access local slaves, such as slaves 120 and 122, without tying up system bus 12.

A bus interface 140 is coupled through a second master bus 142, which includes an address bus 144 and a data bus 146, to a first bridge 150 that is coupled to device 80 through bus 82. A bus interface 160 is coupled through a third slave bus 162, which includes an address bus 164 and a data bus 166, to another bridge 170 that is coupled to device 90 through bus 92. For some applications, interfaces 140 and 160 can be omitted, and the system bus 12 can be connected to bridges 150 and 170.

Bridge 150 is coupled to bridge 170 through a second slave bus 172, which includes an address bus 174 and a data bus 176.

Interface 102 (FIG. 3) is identical to interface 72 and may be understood with reference to FIG. 4.

All of the address busses shown in FIGS. 1–4 are unidirectional, and all of the data busses shown in FIGS. 1–4 are bi-directional.

System bus 12 has a first complexity, and the remaining busses 82, 92, 112, 124, 142, 162 and 172 have a second complexity less than the first complexity. The second complexity of busses 82, 92, 112, 124, 142, 162 and 172 may all be the same. System bus 12 is a multiple-master bus that is a complex bus, and busses 82, 92, 112, 124, 142, 162 and 172 are single-master busses that are simple busses. Bus 12 operates in a plurality of first states that includes one or more of the states of address, data, idle, arbitration, errors, configuration, timing, bursts, termination and interrupts. Busses 82, 92, 112, 124, 142, 162 and 172 operate in a plurality of second states different from the first states. The second states are a subset of the first states. Interfaces 72 and 102 (FIG. 3), as well as bridges within the interfaces, such as bridges 150 and 170 (FIG. 4), translate between the different states in which bus 12 and the remaining busses 82, 92, 112, 124, 142, 162 and 172 operate.

In operation, any master in system 70 may send data to or receive data from any other slave in system 70. Any slave in system 70 may send data to or receive data from any master. For example, first bridge 150 responds to an address from master 80, and second bridge 170 responds to an address from system bus 12. Similarly, master 80 generates a first address and first data and the first bridge 150 directs the first data to system bus 12 or second bridge 170 in response to the first address. In addition, the system bus 12 may transmit a second address and second data. If so, the second bridge 170 directs the first data to slave 90 in response to the first address and directs the second data to the slave 90 in response to the second address.

It is possible for a module to be both a bus master and a bus slave. Interface 72, for example, is both a system bus master and a system bus slave.

There are multiple paths through interface 72 (FIG. 3):

The local master 80 may access the system bus 12;

The system bus 12 may access the local slave 90;

The local master 80 may access the local slave 90 without using the system bus 12.

The method embodiment of the invention is useful in an integrated circuit system comprising plurality of devices, such as masters 80 and 110, slaves 90, 120 and 122 and processor 130. The devices are interconnected by a first bus, such as system bus 12, and one or more second busses, such as busses 82 and 92 or 112 and 124 (FIG. 3), or busses 82, 92, 142, 162 and 172 (FIG. 4). Data is transmitted among the plurality of devices with reference to an address associated with the data, such as an address transmitted on any of the previously described address busses. System bus 12 is operated at a first complexity, and the second busses are operated at a second complexity less than the first complexity. There is translation between the first complexity and the second complexity so that the data is routed on the first bus and one or more second busses in response to the address or is routed only on the one or more second busses in response to the address.

System bus 12 may be operated in a first plurality of states and the one or more second busses may be operated in a second plurality of states different from the first plurality of states. If so, the translating comprises translating between the first plurality of states and the second plurality of states. The first plurality of states for bus 12 include one or more of address, data, idle, arbitration, errors, configuration, timing, bursts, termination and interrupts. Busses 82, 92, 112, 124, 142, 162 and 172 operate in a plurality of second states different from the first states. The second states are a subset of the first states.

Three-way interfaces, like interfaces 72 and 102, are known in the art, but their use in connection with a system bus and various simple or single-master busses as shown in the drawings is believed to be novel, and offers a number of advantages.

Interface 72 handles the complexity of the system bus at the local bus level. The local busses include busses 82, 92, 112, 124, 142, 162 and 172. A local bus is generally much easier to deal with than system bus 12.

Figure 1:
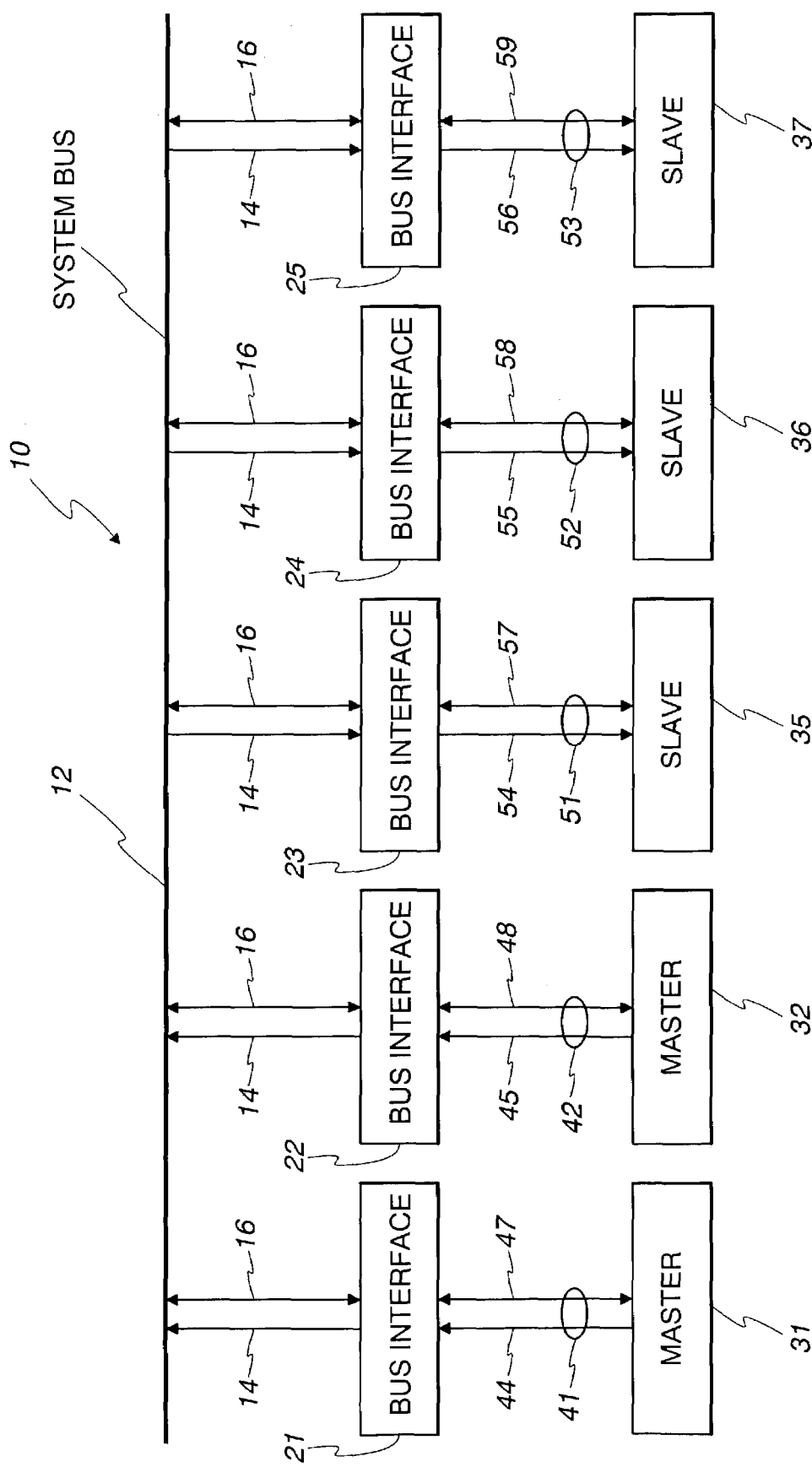
FIG. 1 is a schematic block diagram of one type of an existing integrated circuit for controlling busses of varying complexity.
Figure 2:
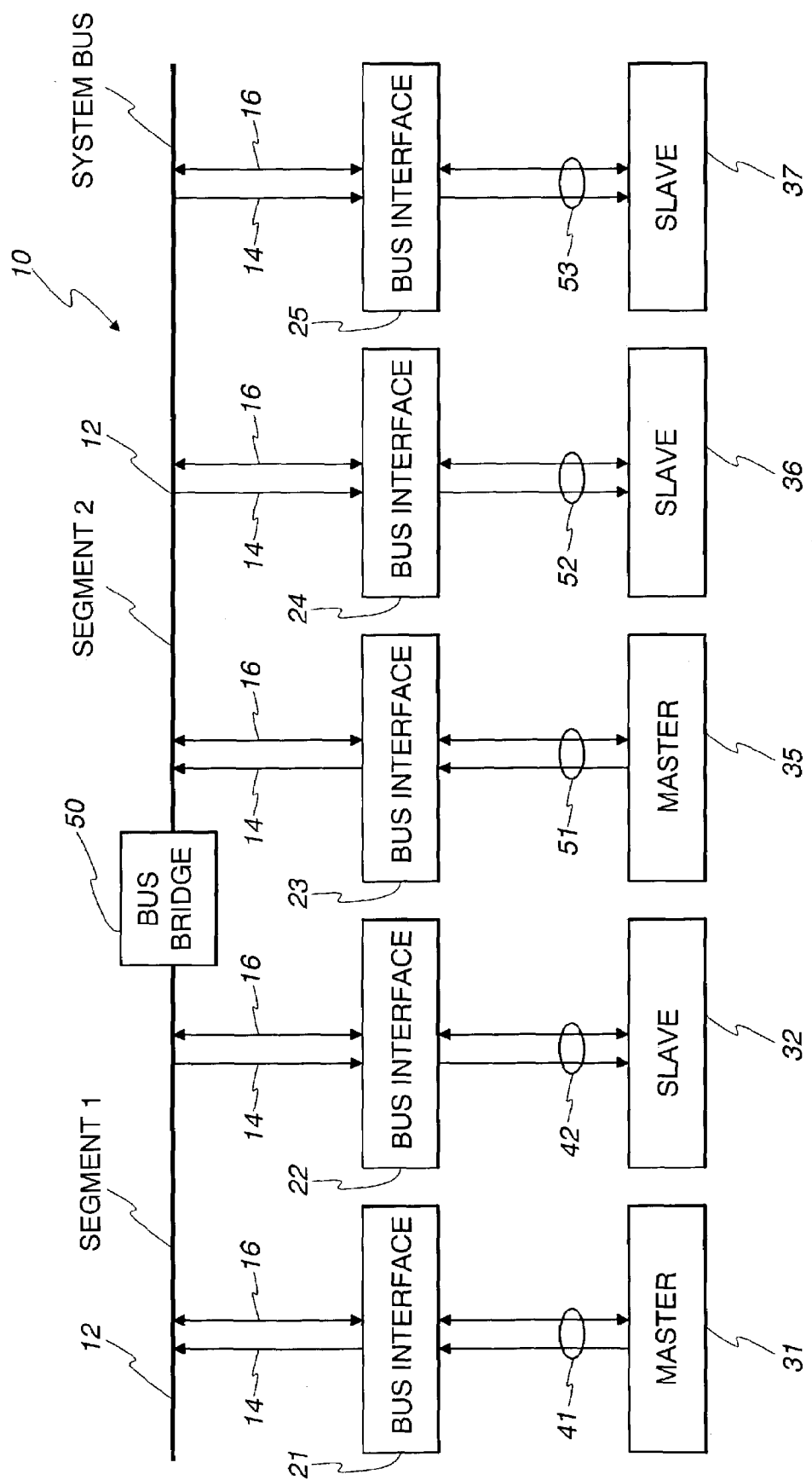
FIG. 2 is a schematic block diagram of another type of an existing integrated circuit for controlling busses of varying complexity.

The bridge solution illustrated in FIG. 2 has multiple system bus segments. This generally requires a complex system bus protocol (such as backoff/retry) to handle resource conflicts. The embodiment shown in FIGS. 3–4 does not require this capability from the system bus.

A segmented system with N blocks would require N system bus segments. Depending on the topology, the worst-case transaction could traverse (N-1) bridges, each with backoff/retry. This path could take a very long time, and could be very difficult to analyze.

A transaction in the embodiment shown in FIGS. 3–4 will never go through more than 2 bus interfaces no matter how many blocks are added to the system.

Local (intra-block) accesses in a segmented-bus system depend on the system bus topology and protocol. In the embodiment illustrated in FIGS. 3–4, local access times are guaranteed by the bus interface 72. The embodiment of FIGS. 3–4 allows blocks with local accesses to be verified independent of the system. (This is a substantial benefit.)

The local busses 82, 92, 112, 124, 142, 162 and 172 are relatively simple. Bridges for the local busses, such as bridges 150 and 172, are much easier to build than bridges for the system bus 12. For simple single-master local busses, the local bus bridges may only require a few thousand gates.

Additional advantages of the embodiment illustrated in FIGS. 3–4 are as follows:

Timing within a block is analyzable. The worst-case local access time is twice the worst-case local slave response time. (Once for a system bus access, and once for the local access.) This worst-case time is independent of the system bus protocol or topology.

Because block timing is analyzable, each block may be verified independent of the rest of the system. Blocks do not need re-verification if the system bus topology changes.

The system has global access. Any master may access any slave over the system bus. (Unless specific restrictions are added.)

The system has no immediate resource conflicts. No bus master is ever required to "backoff" the system bus due to a resource conflict. (This greatly simplifies the protocol requirements of the system bus.)

The loading of the system bus is significantly reduced. There are fewer modules on the system bus, and local (intra-block) traffic is kept off the system bus.

No complex bridges are required. The 3-way interface only adds complexity at the "local bus" level, not at the system bus level. This leads to a system with reduced area, and reduced complexity.

The architecture is easy to use. The only blocks that need to deal with the complex system bus protocol are the 3-way bus interfaces 72 and 102. All other modules or blocks use the simple interface.

Of course, the system bus 12 can be segmented, bridged, or switched without affecting the structure of the blocks. But, complex switching of the system bus 12 is usually not required.

While the invention has been described with reference to one or more preferred embodiments, those skilled in the art will understand that changes may be made and equivalents may be substituted without departing from the scope of the invention. In addition, many modifications may be made to adapt a particular step, structure, or material to the teachings of the invention without departing from its scope. Therefore, it is intended that the invention not be limited to the particular embodiment disclosed, but that the invention will include all embodiments falling within the scope of the appended claims.

What is claimed is:

1. In a system on a chip (SOC) comprising a system bus with a first complexity, apparatus for enabling communication among a plurality of devices comprising:
    at least a first device;
    at least a second device; and
    a bus interface directly connected to the system bus, coupled to the first device through a first bus with a second complexity less than the first complexity and coupled to the second device through a second bus with a third complexity less than the first complexity, the bus interface comprising
    a third bus,
    a fourth bus,
    a fifth bus,
    a first bridge coupled to the second device over the second bus and coupled to the system bus over the third bus with a fourth complexity less than the first complexity, and
    a second bridge coupled to the first device over the first bus, coupled to the first bridge over a the fourth bus with a fifth complexity less than the first complexity and coupled to the system bus over the fifth bus with a sixth complexity less than the first complexity,
    wherein the system bus does not need a back off or retry mechanism to resolve conflicts, and
    wherein the first device, the second device, the bus interface and the system bus are integrated onto a single chip.

2. The apparatus of claim 1 wherein the system bus is arranged to operate in a first plurality of states, wherein the first bus and second bus each are arranged to operate in a second plurality of states different from the first plurality of states and wherein the bus interface comprises a bridge arranged to translate between the first states and the second states.

3. The apparatus of claim 2 wherein the first plurality of states comprises three or more states for the following: address, data, idle, arbitration, errors, configuration, timing, bursts, termination and interrupts and wherein the second plurality of states comprises a subset of the first plurality of states.

4. The apparatus of claim 1 wherein second complexity, third complexity, fourth complexity, fifth complexity and sixth complexity comprise the same complexity.

5. The apparatus of claim 1 wherein the system bus is arranged to operate in a first plurality of states, wherein the first bus and second bus each are arranged to operate in a second plurality of states different front the first plurality of states and wherein the first bridge and second bridge are arranged to translate between the first states and the second states.

6. The apparatus of claim 1 wherein the first bridge responds to an address from the second device and wherein the second bridge responds to an address from the system bus.

7. The apparatus of claim 1 wherein the second device generates a first address and first data and wherein the first bridge directs the first data to one of the system bus and the second bridge in response to the first address.

8. The apparatus of claim 7 wherein the system bus transmits a second address and second data and wherein the second bridge directs the first data to the first device in response to the first address and directs the second data to the first device in response to the second address.

9. The apparatus of claim 1 wherein the first device comprises a first slave, the second device comprises a first master, the first bus comprises a first slave bus, the second bus comprises a first master bus and the bus interface comprises a first bus interface.

10. The apparatus of claim 9 wherein the first bus interface comprises:
    the first bridge coupled to the first master over the first master bus, coupled to the system bus over a second master bus with a fourth complexity less than the first complexity; and
    the second bridge coupled to the first slave over the first slave bus, coupled to the first bridge over a second slave bus with a fifth complexity less than the first complexity and coupled to the system bus over a third slave bus with a sixth complexity less than the first complexity.

11. The apparatus of claim 10 wherein the system bus is arranged to operate in a first plurality of states, wherein the first slave bus and first master bus each are arranged to operate in a second plurality of states different from the first plurality of states and wherein the first bridge and second bridge are arranged to translate between the first states and the second states.

12. The apparatus of claim 10 wherein second complexity, third complexity, fourth complexity, fifth complexity and sixth complexity comprise the same complexity.

13. The apparatus of claim 10 wherein the first bridge responds to a first address from the bus master and wherein the second bridge responds to a second address from the system bus.

14. The apparatus of claim 10 wherein the first master generates a first address and first data and wherein the first bridge directs the first data to one of the system bus and the second bridge in response to the first address.

15. The apparatus of claim 14 wherein the system bus transmits a second address and second data and wherein the second bridge directs the first data to the first slave in response to the first address and directs the second data to the first slave in response to the second address.

16. The apparatus of claim 9 and further comprising:
    a second slave;
    a third slave;
    a second master; and
    a second bus interface coupled to the system bus, coupled to the second slave and the third slave through a second slave bus with a fourth complexity less than the first complexity and coupled to the second master through a second master bus with a fifth complexity less than the first complexity.

17. The apparatus of claim 16 wherein one of the plurality of devices comprises a processor coupled to the system bus and wherein the processor comprises a third master.

18. The apparatus of claim 1 wherein the system bus comprises a multiple-master bus and wherein the first bus and second bus comprise single-master busses.

19. The apparatus of claim 1 wherein the second bridge is not coupled to the system bus only via the first bridge.

20. The apparatus of claim 1 wherein the fourth bus is not directly connected to the second bus.

21. The apparatus of claim 1 wherein the fifth bus is not directly connected with the third bus.

22. The apparatus of claim 1 wherein the fifth bus is not directly connected with the second bus.

23. The apparatus of claim 1 wherein the fifth bus is not directly connected with the fourth bus.

24. The apparatus of claim 1 wherein the third bus is not directly connected with the system bus.

25. The apparatus of claim 1 wherein at least one of the first bus, the second bus, the third bus, the fourth bus and the fifth bus comprises an address bus and a data bus.

26. The apparatus of claim 1,
wherein the first bridge is coupled to the system bus via a first signal path,
wherein the second bridge is coupled to the system bus via a second signal path, and
wherein the first signal path and the second signal path do not overlap.

27. The apparatus of claim 1,
wherein the fifth bus is coupled to a first bus interface, and
wherein the first bus interface is coupled to the system bus.

28. The apparatus of claim 1,
wherein the third bus is coupled to a second bus interface, and
wherein the second bus interface is coupled to the system bus.

29. The apparatus of claim 1 wherein the first device can access the second device without accessing the system bus.

30. The apparatus of claim 1 wherein the first bridge and the second bridge are not combined into a single bridge device.

31. The apparatus of claim 1 wherein the first device accesses the system bus via only one bridge.

32. The apparatus of claim 31 wherein the one bridge comprises the second bridge.

33. The apparatus of claim 1 wherein the second device accesses the system bus via only one bridge.

34. The apparatus of claim 33 wherein the one bridge comprises the first bridge.

35. The apparatus of claim 1 further comprising additional devices that access the system bus via a single bridge.

36. A bus architecture in a system on a chip (SOC), comprising:
a system bus with a first complexity; and
a bus interface adapted to interface directly with the system bus, adapted to interface with a first bus with a second complexity less than the first complexity and adapted to interface with a second bus with a third complexity less than the first complexity,
wherein the bus interface comprises a first bridge adapted to interface with the second bus and adapted to interface with the system bus via a third bus with a fourth complexity less than the first complexity,
wherein the bus interface comprises a second bridge adapted to interface with the first bus, adapted to interface with a fourth bus with a fifth complexity less than the first complexity and adapted to interface with the system bus via a fifth bus with a sixth complexity less than the first complexity,
wherein the bus interface guarantees local access times, and
wherein the bus interface and the system bus are integrated on a single chip.

37. The bus architecture according to claim 36, wherein at most two of the system bus, the first bus, the second bus, the third bus, the fourth bus and the fifth bus have overlapping signal paths.

38. The bus architecture according to claim 36, wherein transactions of the bus architecture never go trough more than two bus interfaces independent of a number of slave or master devices in the SOC.

39. The bus architecture according to claim 36, wherein the bus interface and system bus are on a single chip.

40. The bus architecture according to claim 36, wherein the first bus comprises a single-master bus.

41. The bus architecture according to claim 40, wherein the second bus comprises another single-master bus.

42. The bus architecture according to claim 36, wherein the bus interface comprises a master port, a slave port and a system bus port.

43. The bus architecture according to claim 42, wherein the system bus port is directly connected to the system bus.

44. The bus architecture according to claim 42, wherein the master port is operatively coupled to a decoder.

45. The bus architecture according to claim 42, wherein the slave port is operatively coupled to a first slave device and a second slave device.

46. The bus architecture according to claim 45, wherein a device operatively coupled to the master port accesses the first slave device or the second slave device without accessing the system bus.

47. The bus architecture according to claim 36, wherein all address buses in the bus interface are unidirectional.

48. The bus architecture according to claim 36, wherein a worst-cast local access time is independent of a system bus protocol or topology.

49. The bus architecture according to claim 36, wherein the bus interface supports local accesses without accessing the system bus.

50. The apparatus according to claim 1,
wherein the first bridge does not contain a plurality of bridges, and
wherein the second bridge does not contain a plurality of bridges.

51. The apparatus according to claim 1, wherein the first device and the second device can only communicate with each other via the bus interface.

* * * * *